(12) United States Patent
Lauer

(10) Patent No.: US 7,275,037 B2
(45) Date of Patent: Sep. 25, 2007

(54) SYSTEM AND METHOD FOR GENERATING A SERVICE LEVEL AGREEMENT TEMPLATE

(75) Inventor: Gregory S. Lauer, Sudbury, MA (US)

(73) Assignee: Ericsson AB, Stockholm (SE)

( * ) Notice: Subject to any disclaimer, the term of this patent is extended or adjusted under 35 U.S.C. 154(b) by 676 days.

(21) Appl. No.: 10/054,597

(22) Filed: Jan. 22, 2002

(65) Prior Publication Data

US 2002/0099669 A1 Jul. 25, 2002

Related U.S. Application Data

(60) Provisional application No. 60/264,143, filed on Jan. 25, 2001.

(51) Int. Cl.
*G06Q 99/00* (2006.01)
(52) U.S. Cl. .............. 705/1; 705/80; 345/418; 345/475; 715/700
(58) Field of Classification Search ............ 705/1, 705/80, 8; 345/418–475; 715/700
See application file for complete search history.

(56) References Cited

U.S. PATENT DOCUMENTS

| | | | | |
|---|---|---|---|---|
| 5,907,607 | A | | 5/1999 | Waters et al. ............ 379/207 |
| 6,167,445 | A | | 12/2000 | Gai et al. ............ 709/223 |
| 6,721,713 | B1 | * | 4/2004 | Guheen et al. ............ 705/1 |
| 6,778,651 | B1 | * | 8/2004 | Jost et al. ............ 379/201.01 |
| 6,822,940 | B1 | * | 11/2004 | Zavalkovsky et al. ...... 370/237 |
| 2001/0047276 | A1 | * | 11/2001 | Eisenhart ............ 705/1 |
| 2002/0039352 | A1 | * | 4/2002 | El-Fekih et al. ............ 370/252 |
| 2002/0042782 | A1 | | 4/2002 | Albazz et al. ............ 705/80 |

FOREIGN PATENT DOCUMENTS

JP       2001-69172       3/2001

\* cited by examiner

*Primary Examiner*—Bradley B. Bayat
(74) *Attorney, Agent, or Firm*—Ansel M. Schwartz

(57) ABSTRACT

A system and method for generating a service level agreement (SLA) template are disclosed. The SLA template generated by the disclosed system enables deployment of resources to support a number of SLAs and associated VPNs. The SLA template generated by operation of the disclosed system may include a first graphical user interface (GUI) template that specifies, at least in part, a GUI for use by a customer service representative (CSR) when accepting a service request or order from a customer. The disclosed SLA template may further include a number of SLA defaults, which may consist of default values and or software program code logic. The SLA defaults enable an SLA GUI to be configured such that a relatively small amount of information can be collected and used to derive other necessary configuration data. A second GUI template may be included in the SLA template to specify information to be obtained regarding networking devices and associated resources that must be used to provide a VPN over which are provided the services described in a particular SLA.

19 Claims, 3 Drawing Sheets

SYSTEM AND METHOD FOR GENERATING A SERVICE LEVEL AGREEMENT TEMPLATE

CROSS REFERENCE TO RELATED APPLICATIONS

This application claims priority under 35 U.S.C. §119(e) to provisional application Ser. No. 60/264,143, entitled: "SERVICE LEVEL AGREEMENT/VIRTUAL PRIVATE NETWORK TEMPLATES", and filed Jan. 25, 2001.

STATEMENT REGARDING FEDERALLY SPONSORED RESEARCH OR DEVELOPMENT

N/A

BACKGROUND OF THE INVENTION

The present invention relates generally to communication networks and more specifically to a system and method for developing Service Level Agreements (SLAs), and for supporting SLAs, using SLA templates.

As the world becomes increasingly reliant on the ability to obtain high speed data and voice communications, businesses have formed to provide various types of communication services. For example, Network Service Providers ("NSPs") are in the business of providing network services, including Internet Protocol ("IP") connectivity, simultaneously to many customers. Moreover, each customer of an NSP may have multiple sites which communicate with each other based on services obtained from the NSP. The services provided by NSPs include services based on the provisioning of Virtual Private Networks ("VPNs") over networking resources under the control of the NSPs. These services are often private to individual customers. For example, through the use of VPNs, an NSP may simultaneously provide communication services to multiple client corporations over shared hardware equipment and communication lines owned or leased by the NSP. VPNs enable privacy between different customers of an NSP through assignment of private address spaces to respective individual customers of the NSP.

In business terms, NSPs endeavor to sell multiple, complex services in a highly competitive marketplace, based on price and features. As a result, NSPs must employ complex hardware and software infrastructures to support the feature rich services they offer, while remaining price competitive at the same time. In order to compete within such a framework, NSPs must keep costs, such as labor costs, as low as possible.

Generally speaking, NSP customers contract with an NSP to obtain various specific network services they desire through contracts known as Service Level Agreements (SLAs). In response to SLAs with various customers, the NSP must allocate the network resources necessary to satisfy each customer contract. Due to the high level of complexity in existing systems, developing useful SLAs, and provisioning network resources in response to SLAs, requires large amounts of time from highly trained, highly paid professionals. The costs associated with retaining such highly paid employees for this task contributes significantly to the cost structure of a typical NSP. Accordingly, the time of such highly trained professionals is very valuable, and should be minimized in order to improve the profitability of an NSP business.

For the reasons stated above, it would be desirable to have a system for provisioning network service provider resources in response to customer service level agreements (SLAs) that simplifies the steps necessary to develop SLAs, and to generate the information necessary to provision resources within a network the SLAs. It would further be desirable for such a system to incorporate VPN related constraints to be considered when processing an SLA to generate information used to provision resources in support of the SLA.

BRIEF SUMMARY OF THE INVENTION

In accordance with the present invention, a system and method for generating network node configuration data are disclosed. An SLA template generated by the disclosed system enables convenient deployment of resources to support a number of SLAs and associated VPNs. The SLA template generated by operation of the disclosed system may include a first graphical user interface (GUI) template that specifies, at least in part, a GUI for use by a customer service representative (CSR) when accepting a service request or order from a customer. The GUI template for use by the CSR is sometimes referred to herein, for purposes of illustration, as the "cloud" SLA GUI template. The disclosed cloud SLA GUI template includes information which configures a cloud SLA GUI that enables a CSR to enter information specifying an SLA. The cloud SLA GUI template specifies, for example, how the cloud SLA GUI screens are formatted, what fields are presented for inputting required data, and which fields are presented for optional data.

The SLA template generated by the disclosed system may further include a number of cloud SLA defaults, consisting of default values and/or software program code logic. The cloud SLA defaults stored in the SLA template permit a cloud SLA GUI to be configured based on a relatively small amount of collected information, by automatically deriving the remaining necessary configuration data. Accordingly, during operation of the disclosed system, cloud SLA defaults specify how required information obtained through the cloud SLA GUI is processed to produce other necessary configuration information.

Another GUI template that may be included in the SLA template generated by the disclosed system is a "VPN GUI template." The VPN GUI template specifies information to be obtained regarding networking resources used to provide a VPN over which services are provided for an associated SLA. Such specified information may, for example, describe one or more VPN IDs, connectivity between specific networking devices in a core network, and/or other resource parameters associated with a VPN. The VPN GUI generated from the VPN GUI template may, for example, be used by technical staff of an NSP, referred to as Network Engineering staff, which typically have a higher level of technical training than the above mentioned CSRs. The specific information required by the VPN GUI may be responsive to a specific SLA being processed. For example, a specific SLA may describe only what is referred to herein as "pure cloud" service. Such a pure cloud SLA specifies one or more services only in terms of what is experienced by an end user's edge device or devices. In the event that a pure cloud SLA is being processed, the VPN GUI need not require certain specific information, such as information regarding what is referred to herein as "transit Quality of Service (QoS), " which describes the quality of service between two core networking devices. On the other hand, an SLA may specify one or more transit QoS parameters, which may result in presentation of requests for certain associated inputs through the VPN GUI.

The SLA template may further include a number of default VPN constraints. The default VPN constraints in the SLA template represent constraints on the virtual network over which the services described in the SLA are provided. The VPN default constraints may, for example, indicate the use of a particular topology, such as a hub topology, bi-connected topology, or other, for provisioning of the VPN for a given SLA.

The disclosed system improves the process of obtaining information regarding SLAs, and further simplifies the provisioning of network service provider resources in response to SLAs. Accordingly, less highly trained personal, such as typical CSRs, can be used relatively more often, thus lowering overhead costs for service providers.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION OF THE INVENTION

All disclosures of U.S. provisional patent application Ser. No. 60/264,143 entitled "SERVICE LEVEL AGREEMENT/VIRTUAL PRIVATE NETWORK TEMPLATES", and filed Jan. 25, 2001, are hereby incorporated by reference herein.

As referred to herein, "cloud" SLAs are SLAs which do not specify any technical constraints on how the services defined by the SLA are provided. That is, a cloud SLA only specifies end-user visible characteristics. When an SLA is used, the VPN over which the associated services are provided is opaque, and thus seen as a "cloud" to the end user. Pipe SLAs are those in which the SLA may incorporate technical constraints on how the SLA is to be met. That is, a pipe SLA may specify that the VPN network must be bi-connected, or that all links in the VPN network have a minimum specified bandwidth.

The disclosed system integrates "cloud" and "pipe" service models into a single provisioning model. To accomplish this, the disclosed system determines a "cloud SLA," which describes network services in terms of what is experienced by an end user's edge devices. In order to handle "pipe" service model attributes as well, which place requirements on the virtual network used to support the services provided, the disclosed system optionally determines a number of "transit QoS constraints", which describe the operation of networking devices within the supporting network. Various transit QoS constraints may be specified using the disclosed system, for example:

1. None. In this case, the service provider may determine how to implement a VPN to support the cloud SLA. From the end user's perspective, the resulting services reflect a pure cloud SLA.

2. A constraint that networking devices supporting the SLA in the core network must be bi-connected. In this case, the service provider determines how to implement the cloud SLA subject to the requirement that a single link failure should not partition the VPN over which the services are provided.

3. A constraint that connectivity and bandwidth of the transit network used to support the SLA are completely specified. In this case, the transit network is completely specified and, from the end user's perspective, the resulting services reflect a pipe SLA, in which the VPN over which services are provided is completely specified.

Figure 1:
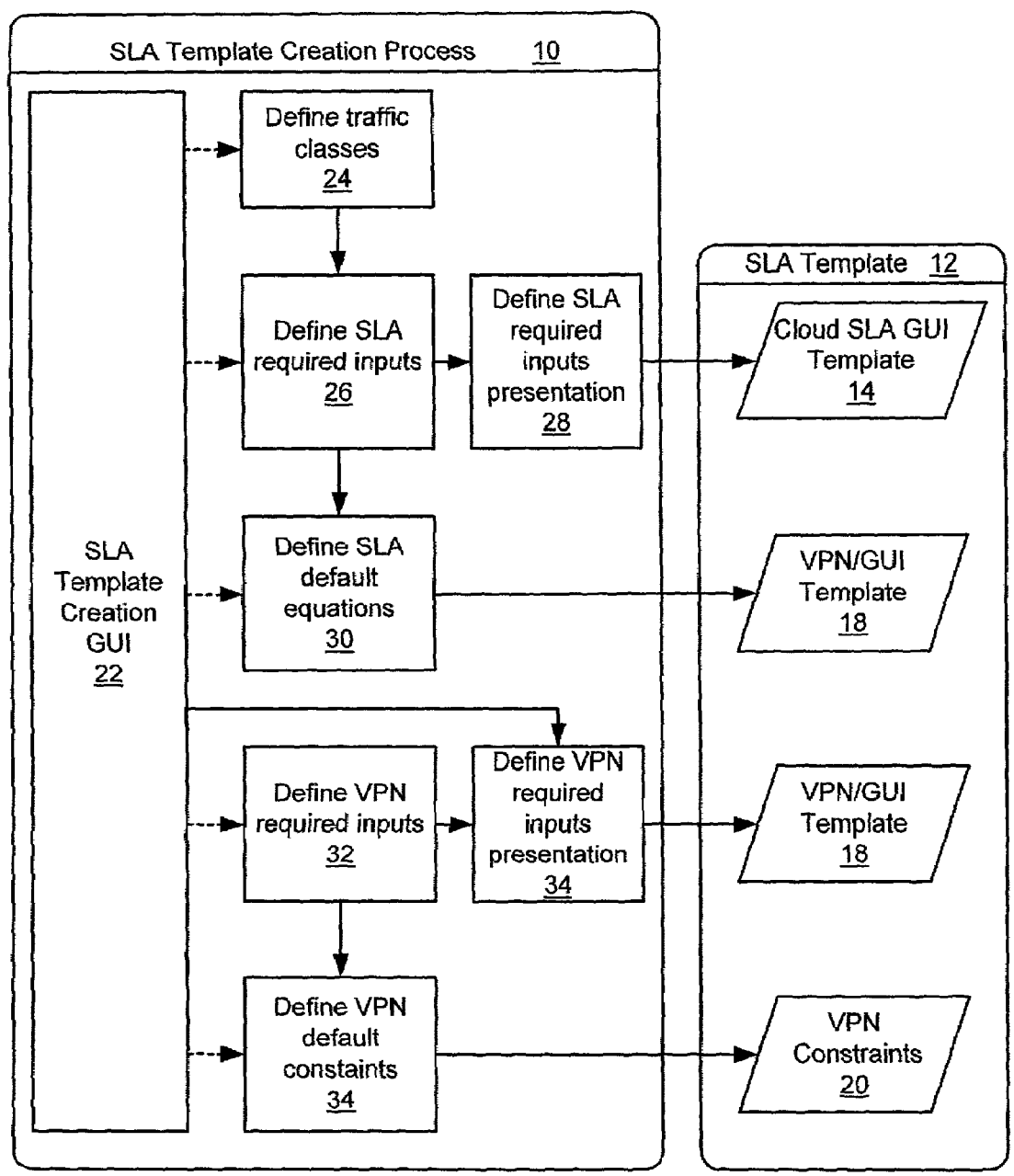
FIG. 1 is a block diagram illustrating the disclosed SLA template creation process.

FIG. 1 illustrates the operation of an embodiment of the disclosed SLA template creation process 10. As shown in FIG. 1, during operation of the disclosed system, the SLA template creation process 10 generates an SLA template 12. The SLA template 12 is shown including a cloud SLA GUI template 14, cloud SLA defaults 16, VPN GUI template 18, and VPN constraints 20. The SLA template 12 may be stored in various specific data structures in a memory of a computer system having one or more processors.

Further as shown in FIG. 1, the SLA template creation process receives inputs through the SLA template creation GUI 22. Data received from a user through the SLA template creation GUI 22 is processed as shown by the steps within the SLA template creation process 10. The SLA template creation process 10 may, for example, be implemented as software capable of execution on one or more processors, and stored in a memory communicably coupled to such processors.

At step 24, the SLA template creation process 10 defines a number of traffic classes. The traffic classes defined at step 24 define a traffic class hierarchy. See FIG. 3 for an example of a traffic class hierarchy. Different traffic class hierarchies require different configuration parameters, since each class may be associated with its own service properties, such as bandwidth percentage and/or priority of service.

The traffic classes defined at step 24 may, for example, be input directly by a user through the SLA template creation GUI 22. In response to the traffic classes defined at step 24, at step 26, the SLA template creation process 10 defines SLA required inputs for each traffic class. The SLA required inputs defined at step 26 specify information that is required to be obtained through the subsequently generated SLA GUI in order to create a valid SLA using the SLA template 12, such as traffic classes and bandwidths for individual SLAs.

The required inputs defined at step 26 may also be defined directly by a user through the SLA template creation GUI 22. Additionally, some or all of the required inputs defined at step 26 may be obtained on a class by class basis from the user in response to the specific traffic classes defined at step 24. For example, in the case where the user as defined two traffic classes at step 24, step 26 may involve providing prompts the user for required inputs for each of the two traffic classes defined at step 24.

At step 28, the SLA template creation process 10 defines the presentation to be used for obtaining the SLA required inputs defined at step 26. In step 28, the SLA template creator specifies aspects of how one or more of the required inputs are obtained through a subsequently generated SLA GUI, for example, names of fields, valid entry types, and/or input formats such as enumerated lists. The output of step 28 is stored as the cloud SLA GUI template 14 within the SLA template 12. The output of step 28 may, for example, consist of a number of data items defining the presentation of the request for each required input associated with the cloud SLA GUI.

Optional inputs may be defined by the disclosed system in the same or a similar manner as required inputs. However, in contrast to the required inputs, a default value is specified or computed for each optional input. In the illustrative embodiment, the default value for an optional input can be overwritten by a user. The program code which elicits the required inputs from the CSRs and NEs, via the SLA and VPN templates respectively, won't proceed without the required inputs. Such program code will proceed whether or not the CSR or NE overwrites the optional data.

At step 30 of the SLA template creation process 10, one or more SLA default equations are defined. The default equations defined at step 30 may enable many parameters to be computed from a few required inputs. For example, a default equation may be defined that defines the allocation of bandwidth to a high priority traffic class as being equal to 10% of the total link bandwidth across an underlying VPN. Under such circumstances, when configuration data is subsequently generated based on the SLA template 12, the amount of bandwidth allocated to a high priority class of traffic would be calculated as 10% of the total link bandwidth. Accordingly, at step 30, the SLA template creator may specify equations which derive a number of calculated parameters from the required inputs defined in step 26.

The SLA default equations defined at step 30 of FIG. 1 may, for example, be received directly from a user through the SLA template creation GUI 22. The SLA default equations may be provided and stored as any appropriate type of software program code and/or data structure. The SLA default equations may be associated with one or more of the SLA required inputs defined at step 26. For example, a user may provide a set of default equations to be applied to the values of some number of the required inputs associated with each of the traffic classes defined at step 24.

For example, a two level traffic class hierarchy may be used during operation of the illustrative embodiment. For each class and access link, an ingress peak limit parameter must be specified. Under such circumstances, the ingress peak limit parameter may be used in the disclosed system only to determine how much bandwidth is available to the subclasses. Further during operation of the disclosed system, a given SLA may define that there are two subclasses to a class: "high priority" which receives 10% of the bandwidth, and "low priority" which receives all the unused bandwidth. The required input in this regard would be classIngressPeakLimit and the default equations would be:

SubclassHighPriorityPeakLimit=.1* classIngressPeakLimit

SubclassLowPriorityPeakLimit="rest"

where "rest" means that the subclass gets all the bandwidth in the class that's not being used by other subclasses. The default equations defined at step 30 may consist of default values to be presented in association with the required inputs defined at step 26. Accordingly, a default value might be presented to a user of the cloud SLA GUI in a field in for one of the required inputs defined at step 26. In the event that the user does not over-write the default value, the disclosed system stores the default value as the value for that required input. The output of step 30 is stored as the cloud SLA defaults 16 in the SLA template 12.

The disclosed system defines a number of VPN required inputs at step 32. At step 32 the SLA template creator may define the information that is required to be obtained through a subsequently generated VPN GUI in order to configure a valid VPN to support services defined using the SLA template 12. For example, the required inputs defined at step 32 may include information needed about the underlying VPN topology for one or more services, such as which networking devices are supporting the VPN. The specific set of VPN required inputs for a given SLA generated using the SLA template 12 may depend on the type of SLA being defined. In the case where a "pure cloud" SLA is being processed, which specifies one or more services only in terms of what is experienced by an end user's edge device or devices, there may be no required VPN inputs, since the VPN configuration is not specified. Alternatively, an SLA template may be processed which requires that services be defined also in terms of "transit Quality of Service (QoS)," which describes a quality of service between networking devices. In such an instance, required VPN inputs may include type of topology (unconstrained, mesh, hub), identity of special nodes (e.g., which one is the hub), transit network topology, and/or transit network link bandwidth, a VPN ID, connectivity requirements between specific networking devices in a core network, and/or other resource parameters associated with a VPN. The specified transit network link bandwidth may be a minimum across the whole VPN if the topology is not explicitly defined (e.g., only the reliability or connectivity requirements are specified). Alternatively, the transit network link bandwidth may be the bandwidth of each link if the transit topology is explicitly defined. The VPN required inputs defined at step 32 may, for example, be obtained directly from user inputs provided through the SLA template creation GUI 22.

At step 34, the SLA template creation process 10 defines the presentation in the VPN GUI for receiving the VPN required inputs defined at step 32. The specific presentation format for obtaining the VPN required inputs may, for example, be received by the disclosed system directly from the user through the SLA template creation GUI 22. The combined VPN required inputs and presentation information defined at steps 32 and 34 respectfully are stored in the VPN GUI template 18.

VPN default constraints are defined at step 36. For VPNs supporting cloud model SLAs, the default constraints defined at step 36 may specify a VPN topology to be used, such as mesh, hub, bi-connected, unconstrained, or redundant. For an SLA template which forms a pipe model SLA, step 36 is not required since the VPN topology is specified through the subsequently generated VPN GUI.

As shown in FIG. 1, the SLA template 12 includes a cloud SLA GUI template 14, cloud SLA defaults 16, a VPN GUI template 18, and VPN constraints 20. The SLA GUI template 12 may be embodied using any appropriate data structures and/or program code, in any file format. The cloud SLA GUI template 14 contains information which configures a subsequently generated SLA GUI so that a user, such as a CSR, can be guided in obtaining and providing information needed to specify an SLA being sold. The SLA GUI template 14 specifies how the SLA GUI screens are formatted, as well as which fields within those screens are for required data and which are for optional data to be provided by the user.

The cloud SLA defaults 16 may be default values or program code logic that is to be applied to the required and/or optional input values obtained through the cloud SLA GUI. The program code used for such program code logic may be provided in any appropriate programming language. In this way, the cloud SLA defaults 16 specify how required and/or optional information is processed to produce additional information.

The VPN GUI template 18 specifies information which must be obtained through a subsequently generated VPN GUI, from a user such as a Network Engineering staff member and/or the CSR. The information obtained through the VPN GUI describes the configuration of the VPN associated with an SLA, such as the VPN ID, the level of required core connectivity, and/or other parameters. The information stored in the VPN GUI template 18 depends on the specific associated SLA. For example, a pure cloud model SLA might not require any information about transit QoS to be obtained through the VPN GUI generated based on the VPN GUI template 18, while a pipe model SLA would require that transit QoS information be obtained. The VPN constraints 20 specify constraints on the transit network that must be used to support the SLA.

Figure 2:
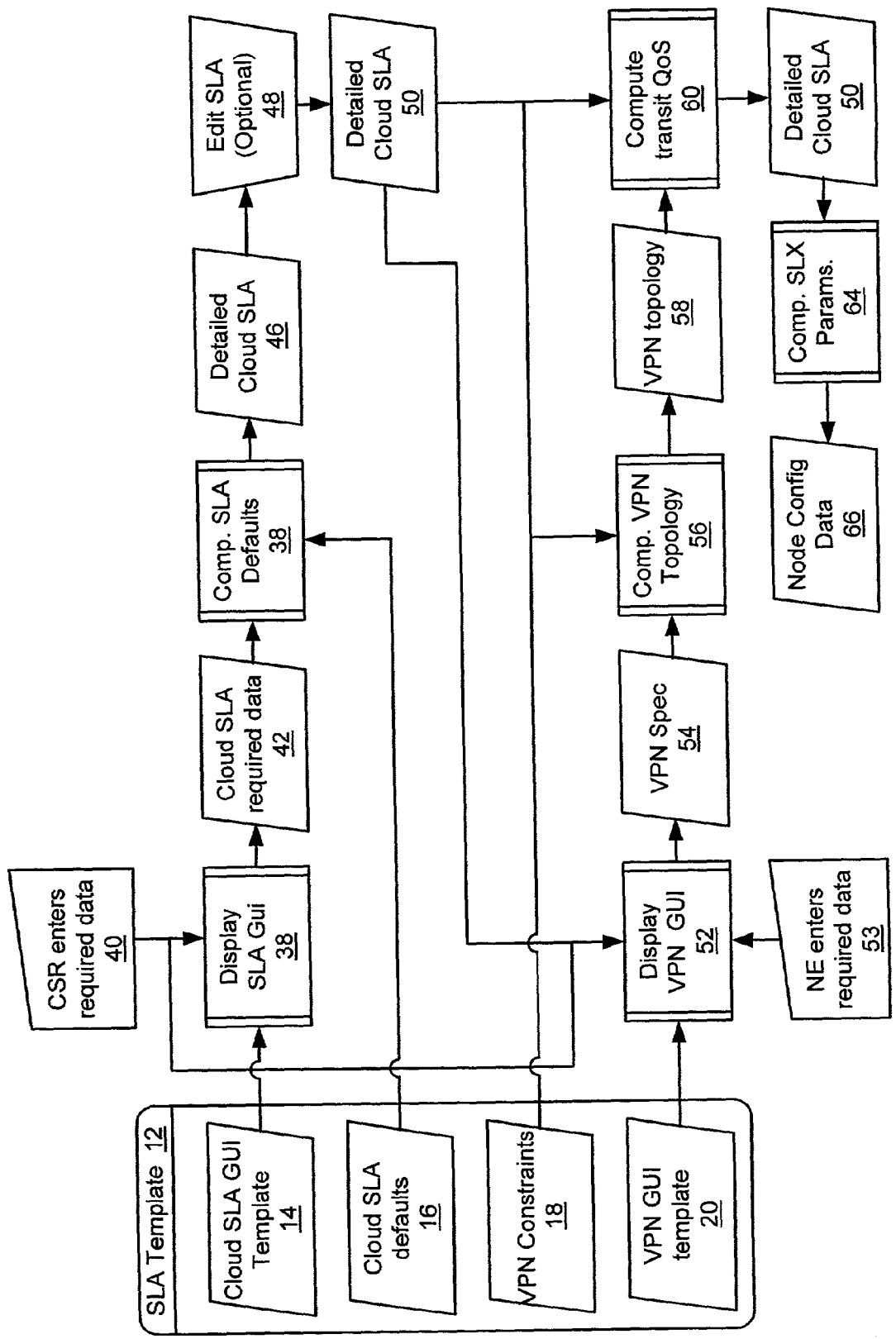
FIG. 2 is a block diagram illustrating the use of the disclosed SLA templates.

FIG. 2 illustrates the process by which the disclosed system uses the SLA template 12 to generate node configuration data 66. As shown in FIG. 2, the cloud SLA GUI template 14 is loaded into a processor capable of causing the SLA GUI to be displayed at step 38. By displaying the SLA GUI template 14, the disclosed system instantiates a new service which can be offered by the service provider. When this new service is sold to an end-user, at step 40, a CSR enters the required SLA information via the SLA GUI, thereby generating the cloud SLA required data 42. In step 44, software executing in the disclosed system operates to apply code logic in the cloud SLA defaults 16 to the cloud SLA required data 42, in order to compute the remaining cloud SLA parameters necessary to form the initial detailed cloud SLA 46. For example, the cloud SLA 46 may be implemented using data structures such as in a relational database, tables or lists. At step 48, the information stored in the initial detailed cloud SLA 46 may be edited, for example using a word processor, text editor, or through a custom GUI. The output of step 48, shown as the revised detailed cloud SLA 50, describes the services of the SLA being generated in terms of what is experienced by an end user. In the illustrative embodiment, however, the revised detailed cloud SLA 50 does not describe the internal topology of the VPN that will be used to provide the services described in the revised detailed cloud SLA 50.

At step 52 of FIG. 2, the VPN GUI template 20 is loaded into a VPN GUI, thus allowing a user of the VPN GUI, such as a Network Engineering (NE) staff member, to enter the VPN required information. In response to the VPN required information, software functionality within the disclosed system generates a VPN specification 54. The VPN specification 54 and the VPN constraints 18 are used by a software module in the disclosed system to generate a VPN topology 58. Typically the VPN topology 58 will describe the networking devices which terminate the core network nodes of the VPN that attach to the customer sites, the topology of the core network, and a VPN ID that identifies the VPN.

At step 60, software within the disclosed system operates to combine the detailed cloud SLA specification 50 and the VPN topology 58 to compute the transit QoS parameters. The processing performed at step 60 may be constrained by the VPN constraints 18. The result of step 60 is the service level specification (SLS) 62. The SLS 62 is a detailed description of traffic classes, peak and committed rates, and any other parameters that must be known to implement the VPN. The SLS 62 must be sufficiently detailed so that at step 64 the disclosed system can operate to compute a number of parameters that can be stored as node configuration data 66, which can serve as network device configuration files.

Figure 3:
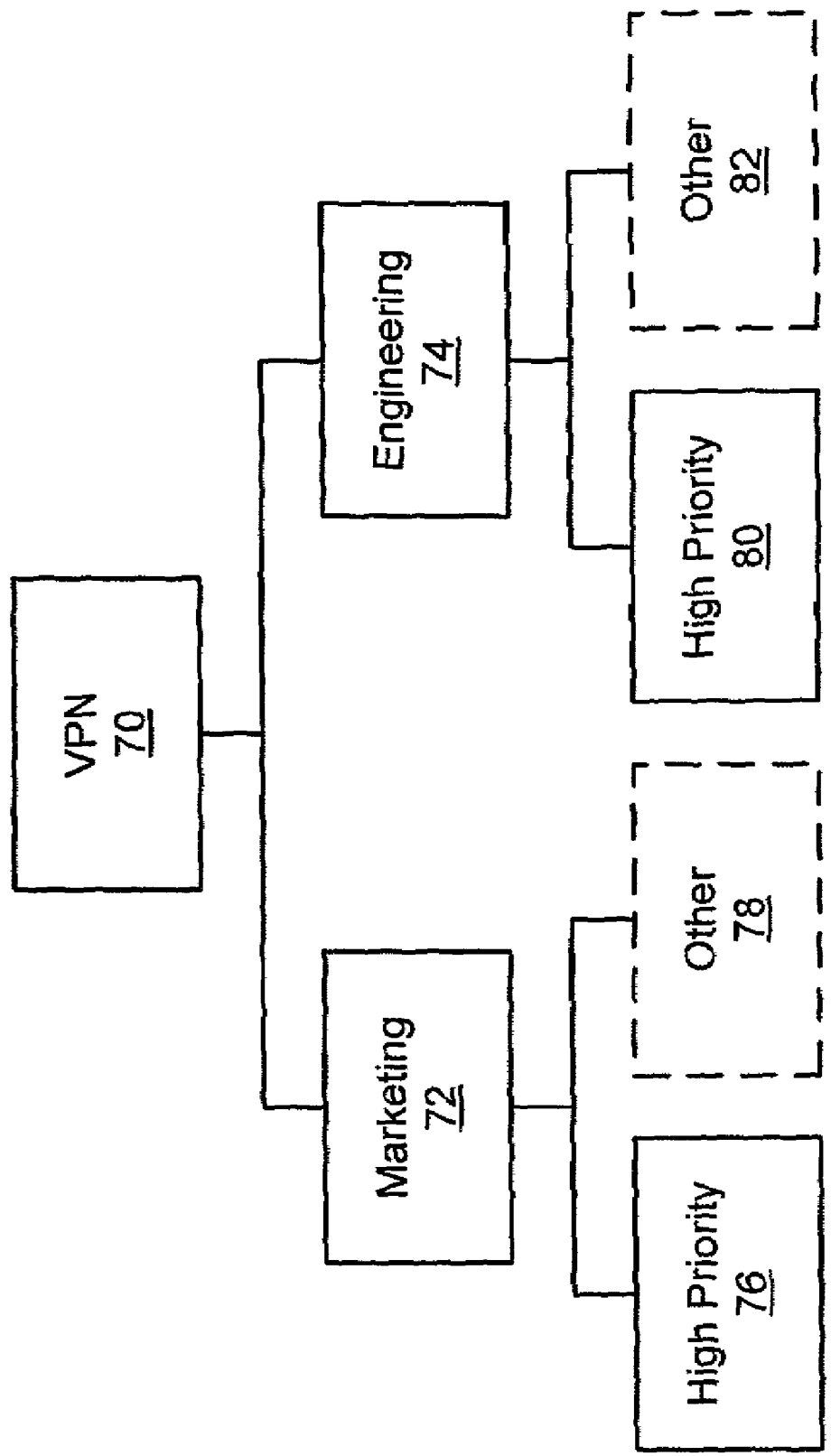
FIG. 3 shows a traffic hierarchy including a traffic class and subclasses.

In the disclosed system, traffic classes are used to organize data required to configure a given VPN. Traffic classes specify how data is separated into different classes for differential treatment and provide a way to organize the parameters associated with a VPN SLA, such as allocated bandwidth, traffic priority, and others. As shown in the traffic class hierarchy of FIG. 3, the disclosed traffic classes are defined per VPN. In FIG. 3, a single VPN is defined as having two traffic classes. The first traffic class Marketing 72 is allocated 500 KBPS of bandwidth, and the second traffic class Engineering 74 is allocated 1 MBPS of bandwidth. Each of the traffic classes 72 and 74 are defined as including two subclasses. The traffic class 72 is shown having a high-priority subclass 76 and other traffic 78. Similarly, the Engineering traffic class 74 is shown including a high-priority subclass 80 and other traffic 82. For example, the high priority subclasses of both the Marketing subclass 72 and the Engineering subclass 74 may be limited to 20% of the total available bandwidth, while the other traffic gets the rest of the bandwidth.

In order to support the disclosed traffic classes, a traffic classifier module is provided in each access device through which customer equipment connects to the core network. The traffic classifier is unaware of the class hierarchy, but operates to apply a list of rules which define the traffic classes in the traffic class hierarchy. In one embodiment, the list of rules is a set of 7-tuples, each having an entry for channel ID, DSCP (differentiated services code point), protocol ID, source IP address, source IP port, destination IP address and destination port. If a packet matches the information in a rule, it belongs to the associated traffic class. Each rule can be thought of as a row where the entry in a column specifies the kind of match required. The following entries are supported:

Protocol—a single protocol ID, range, set or wildcard
DSCP—a code point and mask or wildcard
Source Address—an IPv4 address and mask or wildcard
Source Port—a single port number, range or wildcard
Destination Address—an IPv4 address and mask or wildcard
Destination Port—a single port number, range or wildcard Note that the rows are evaluated "in order" to find match—thus the last rule should match everything else that needs special treatment, since no match means that the packet will be forwarded based on the destination address and DSCP. Once the traffic class of a given packet is determined based on this set of rules, it can be handled using service type that is associated with that traffic class.

Those skilled in the art should readily appreciate that programs defining the functions of the disclosed system and method can be implemented in software and delivered to a computer system for execution in many forms; including, but not limited to: (a) information permanently stored on non-writable storage media (e.g. read only memory devices within a computer such as ROM or CD-ROM disks readable by a computer I/O attachment); (b) information stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the illustrative embodiments may be implemented in computer software, the functions within the illustrative embodiments may alternatively be embodied in part or in whole using hardware components such as Application Specific Integrated Circuits, Field Programmable Gate Arrays, or other hardware, or in some combination of hardware components and software components. While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

What is claimed is:

1. A method for generating node configuration data, comprising the steps of: forming a service level agreement template that integrates cloud and pipe service models into a single provisioning model by describing network services in terms of what is experienced by an end user's edge devices and by determining a number of transit QoS constraints, including that network devices supporting the service level agreement in a core network must be bi-connected, respectively, said service level agreement template including a cloud SLA GUI template, cloud SLA defaults, a VPN GUI template, and VPN constraints, said forming including with a computer system, the computer generated steps of:

displaying a SLA GUI;
displaying a VPN GUI;
entering required SLA information via the SLA GUI thereby generating cloud SLA required data;
entering required VPN information via the VPN GUI;
computing SLA defaults;
computing VPN topology from the VPN information;
computing transit QoS from the VPN topology and the cloud SLA to produce a service level specification that includes a detailed description of the traffic classes, peak and committed rates to implement the VPN;
computing SLX parameters from the service level specification;
determining a plurality of traffic classes;
defining a traffic class hierarchy from the plurality of traffic classes based on each class' own service properties, including bandwidth percentage and priority of service;
determining at least one required input for a first graphical user interface for each traffic class;
determining at least one required input for a second graphical user interface;
obtaining service level agreement constraints for at least one service level agreement, said obtaining including;
generating said first graphical user interface;
obtaining, through said first graphical user interface, indication of a selected one of said plurality of traffic classes;
obtaining, through said first graphical user interface, at least one value associated with said at least one required input for said first graphical user interface;
generating said second graphical user interface;
obtaining, through said second graphical user interface, indication of a selected second of said plurality of traffic classes;
obtaining, through said second graphical user interface, at least one value associated with said at least one required input for said second graphical user interface; and
generating, responsive to said selected one of said plurality of traffic classes, said at least one value associated with said at least one required input for said first graphical user interface, and said at least one value associated with said at least one required input for said second graphical user interface, node configuration data, said node configuration data describing how at least one resource in at least one networking device is to be configured to support at least one network service described by said selected one of said plurality of traffic classes, said at least one value associated with said at least one required input for said first graphical user interface.

2. The method of claim 1, further comprising:
determining at least one default equation associated with said first graphical user interface;
applying said default equation to said at least one value associated with said at least one required input for said first graphical user interface to generate a first set of outputs; and
wherein said generating said node configuration data is further responsive to said first set of outputs.

3. The method of claim 2, said forming said service level agreement template further comprising:
determining at least one optional input for said first graphical user interface;
determining at least one format of at least one screen display in said first graphical user interface, wherein said at least one screen format includes a first field associated with said required input for said first graphical user interface and a second field associated with said optional input for said second graphical user interface; and
wherein said generating said first graphical user interface includes displaying said at least one screen display.

4. The method of claim 3, wherein said at least one default equation comprises program code.

5. The method of claim 4, wherein said determining said at least one required input for said second graphical user interface further comprises determining required information describing at least one resource associated with at least one networking device, wherein said required information associated with said at least one resource describes, at least in part, a virtual private network.

6. The method of claim 5, wherein said required information describing said at least one resource comprises a virtual network identifier.

7. The method of claim 6, wherein said required information describing said at least one resource comprises an indication of whether connectivity is required between said at least one networking device and a second networking device.

8. The method of claim 7, wherein said forming said service level agreement template further includes:
determining at least one optional input for said second graphical user interface,
determining at least one format of at least one screen display in said second graphical user interface, wherein said at least one screen format includes a first field associated with said required input for said second graphical user interface and a second field associated with said at least one optional input for said second graphical user interface; and
wherein said generating said second graphical user interface includes displaying said at least one screen display in said second graphical user interface responsive to said at least one format.

9. The method of claim 8, wherein said forming a service level agreement template comprises receiving at least one input through a third graphical user interface.

10. A system for generating node configuration data, comprising:
at least one memory for storing program code;
at least one processor, communicably coupled to said memory, said at least one processor operable to execute program code stored in said memory;

program code, stored in said memory, for forming a service level agreement template that integrates cloud and pipe service models into a single provisioning model by describing network services in terms of what is experienced by an end user's edge devices and by determining a number of transit QoS constraints, including that network devices supporting the service level agreement in a core network must be bi-connected, respectively, said service level agreement template including a cloud SLA GUI template, cloud SLA defaults, a VPN GUI template, and VPN constraints, said program code for forming said service level agreement template including program code for displaying a SLA GUI;

program code for displaying a VPN GUI;

program code for entering required SLA information via the SLA GUI thereby generating cloud SLA required data;

program code for entering required VPN information via the VPN GUI;

program code for computing SLA defaults;

program code for computing VPN topology from the VPN information;

program code for computing transit QoS from the VPN topology and the cloud SLA to produce a service level specification that includes a detailed description of the traffic classes, peak and committed rates to implement the VPN;

program code for computing SLX parameters from the service level specification;

program code for determining a plurality of traffic classes;

program code for defining a traffic class hierarchy from the plurality of traffic classes based on each class' own service properties, including bandwidth percentage and priority of service;

program code for determining at least one required input for a first graphical user interface, and program code for determining at least one required input for a second graphical user interface;

program code, stored in said memory, for obtaining service level agreement constraints for at least one service level agreement, said program code for obtaining including said service level agreement constraints including;

program code for generating said first graphical user interface, program code for obtaining, through said first graphical user interface, indication of a selected one of said plurality of traffic classes, program code for obtaining, through said first graphical user interface, at least one value associated with said at least one required input for said first graphical user interface, program code for generating said second graphical user interface, and program code for obtaining, through said second graphical user interface, indication of a selected second of said plurality of traffic classes, program code for obtaining, through said second graphical user interface, at least one value associated with said at least one required input for said second graphical user interface; and program code, stored in said memory, for generating, responsive to said selected one of said plurality of traffic classes, said at least one value associated with said at least one required input for said first graphical user interface, and said at least one value associated with said at least one required input for said second graphical user interface, node configuration data, said node configuration data describing how at least one resource in at least one networking device is to be configured to support at least one network service described by said selected one of said plurality of traffic classes, said at least one value associated with said at least one required input for said first graphical user interface.

11. The system of claim 10, further comprising:

program code for determining at least one default equation associated with said first graphical user interface;

program code for applying said default equation to said at least one value associated with said at least one required input for said first graphical user interface to generate a first set of outputs; and wherein said program code for generating said node configuration data is further responsive to said first set of outputs.

12. The system of claim 11, said program code for forming said service level agreement template further comprising:

program code for determining at least one optional input for said first graphical user interface;

program code for determining at least one format of at least one screen display in said first graphical user interface, wherein said at least one screen format includes a first field associated with said required input for said first graphical user interface and a second field associated with said optional input for said second graphical user interface; and wherein said program code for generating said first graphical user interface includes program code for displaying said at least one screen display.

13. The system of claim 12, wherein said at least one default equation comprises program code.

14. The system of claim 13, wherein said program code for determining said at least one required input for said second graphical user interface further comprises program code for determining required information describing at least one resource associated with at least one networking device, wherein said required information associated with said at least one resource describes, at least in part, a virtual private network.

15. The system of claim 14, wherein said required information describing said at least one resource comprises a virtual network identifier.

16. The system of claim 15, wherein said required information describing said at least one resource comprises an indication of whether connectivity is required between said at least one networking device and a second networking device.

17. The system of claim 16, said program code for forming said service level agreement template further comprising:

program code for determining at least one optional input for said second graphical user interface;

program code for determining at least one format of at least one screen display in said second graphical user interface, wherein said at least one screen format includes a first field associated with said required input for said second graphical user interface and a second field associated with said at least one optional input for said second graphical user interface; and wherein said program code for generating said second graphical user interface includes program code for displaying said at least one screen display in said second graphical user interface responsive to said at least one format.

18. The system of claim 17, wherein said program code for forming a service level agreement template comprises program code for receiving at least one input through a third graphical user interface.

19. A system for generating node configuration data, comprising:
- means for forming a service level agreement template that integrates cloud and pipe service models into a single provisioning model by describing network services in terms of what is experienced by an end user's edge devices and by determining a number of transit QoS constraints, including that network devices supporting the service level agreement in a core network must be hi-connected, respectively, said service level agreement template including a cloud SLA GUI template, cloud SLA defaults, a VPN GUI template, and VPN constraints, said program code for forming said service level agreement template including
- means for displaying a SLA GUI;
- means for displaying a VPN GUI;
- means for entering required SLA information via the SLA GUI thereby generating cloud SLA required data;
- means for entering required VPN information via the VPN GUI;
- means for computing SLA defaults;
- means for computing VPN topology from the VPN information;
- means for computing transit QoS from the VPN topology and the cloud SLA to produce a service level specification that includes a detailed description of the traffic classes, peak and committed rates to implement the VPN;
- means for computing SLX parameters from the service level specification;
- means for determining a plurality of traffic classes,
- means for defining a traffic class hierarchy from the plurality of traffic classes based on each class' own service properties, including bandwidth percentage and priority of service;
- means for determining at least one required input for a first graphical user interface, and
- means for determining at least one required input for a second graphical user interface;
- means for obtaining service level agreement constraints for at least one service level agreement, said means for obtaining including said service level agreement constraints including
- means for generating said first graphical user interface,
- means for obtaining, through said first graphical user interface, indication of a selected one of said plurality of traffic classes,
- means for obtaining, through said first graphical user interface, at least one value associated with said at least one required input for said first graphical user interface,
- means for generating said second graphical user interface, and
- means for obtaining, through said second graphical user interface, indication of a selected second of said plurality of traffic classes,
- means for obtaining, through said second graphical user interface, at least one value associated with said at least one required input for said second graphical user interface; and
- means for generating, responsive to said selected one of said plurality of traffic classes, said at least one value associated with said at least one required input for said first graphical user interface, and said at least one value associated with said at least one required input for said second graphical user interface, node configuration data, said node configuration data describing how at least one resource in at least one networking device is to be configured to support at least one network service described by said selected one of said plurality of traffic classes, said at least one value associated with said at least one required input for said first graphical user interface.

* * * * *

UNITED STATES PATENT AND TRADEMARK OFFICE
CERTIFICATE OF CORRECTION

| | |
|---|---|
| PATENT NO. | : 7,275,037 B2 |
| APPLICATION NO. | : 10/054597 |
| DATED | : September 25, 2007 |
| INVENTOR(S) | : Lauer |

Page 1 of 1

It is certified that error appears in the above-identified patent and that said Letters Patent is hereby corrected as shown below:

In Column 11, Line 14, in Claim 10, delete "GUL;" and insert -- GUI; --, therefor.

In Column 11, Line 15, in Claim 10, delete "GUL;" and insert -- GUI; --, therefor.

In Column 13, Line 17, in Claim 19, delete "hi-connected," and insert -- bi-connected, --, therefor.

Signed and Sealed this

Eleventh Day of November, 2008

JON W. DUDAS
*Director of the United States Patent and Trademark Office*